United States Patent

[11] 3,609,058

| [72] | Inventor | Balazs K. Tarsoly<br>32 Engelke Ave., Huntington Station, N.Y. 11746 |
|---|---|---|
| [21] | Appl. No. | 855,933 |
| [22] | Filed | Sept. 8, 1969 |
| [45] | Patented | Sept. 28, 1971 |

[54] TURBINE MOTOR HAVING BALANCED GAS LUBRICATED ROTOR
6 Claims, 12 Drawing Figs.

[52] U.S. Cl. .................................................. 415/104,
415/72, 32/27, 415/503, 415/180
[51] Int. Cl. .................................................. F01d 3/00,
F01d 3/04, F01d 5/08
[50] Field of Search .......................................... 415/72,
104, 106, 180, 503; 32/27

[56] References Cited
UNITED STATES PATENTS

| 3,218,028 | 11/1965 | Borolen | 415/503 |
| 3,210,044 | 10/1965 | Mori | 415/503 |

*Primary Examiner*—Henry F. Raduazo
*Attorney*—Polachek & Saulsbury

ABSTRACT: A gas-driven motor has a cylindrical rotor provided with helical vanes. The rotor has end bearings which are lubricated and cooled by spent gas passing out of opposite ends of the rotor. Pressurized gas is fed to a stationary cylindrical housing in which the rotor is mounted. In the housing the gas is distributed circumferentially around the rotor by a cylindrical manifold.

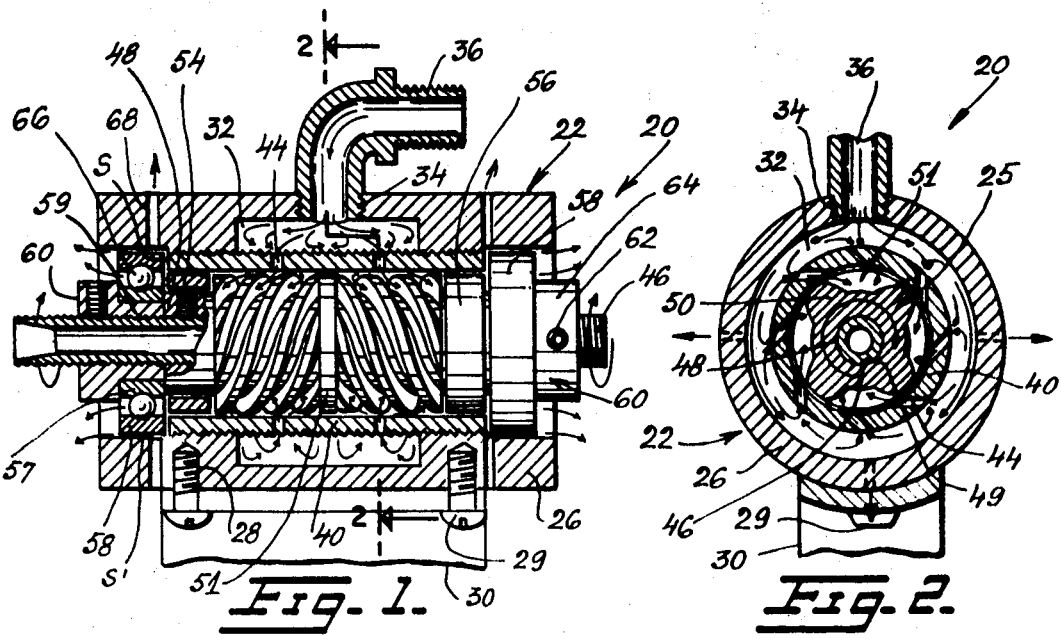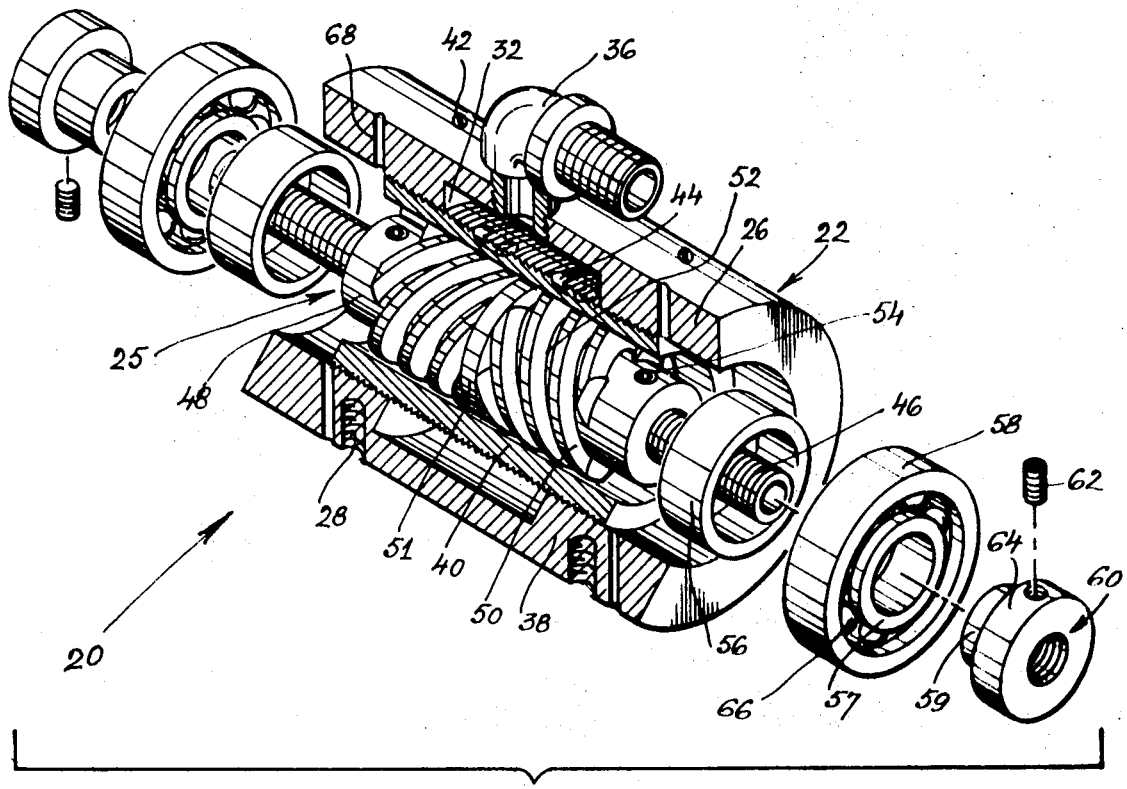

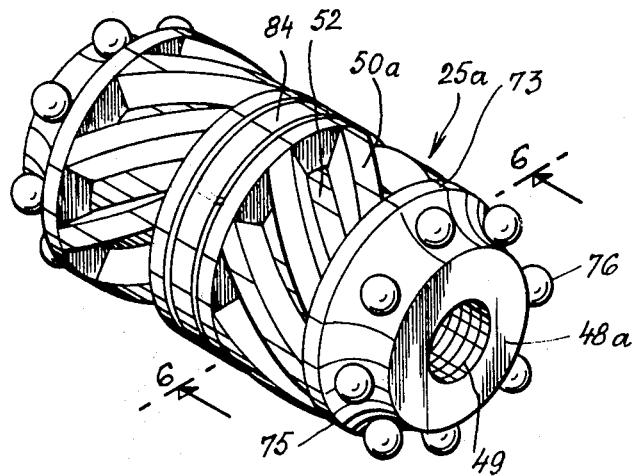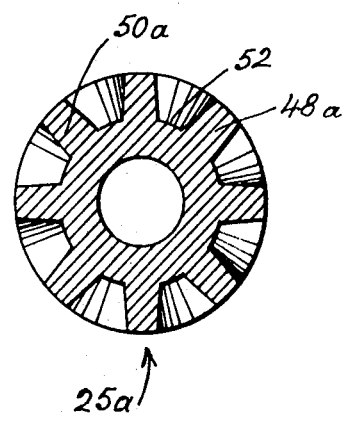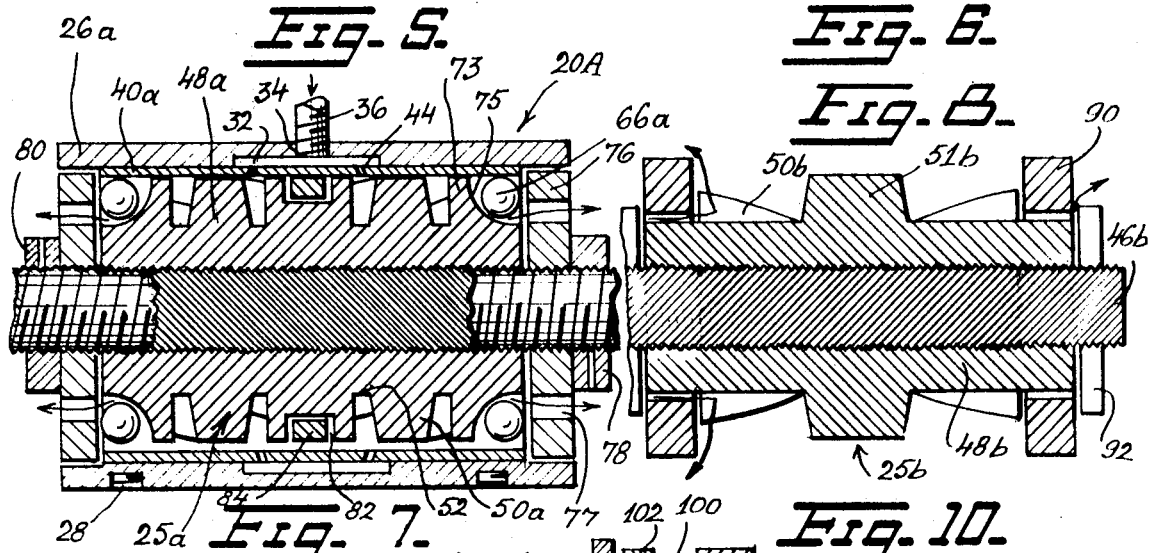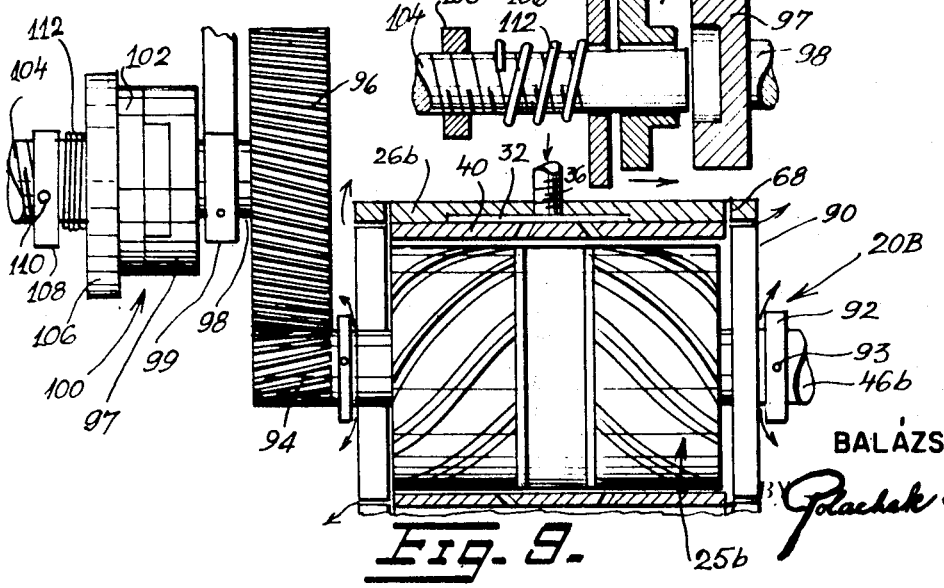

TURBINE MOTOR HAVING BALANCED GAS LUBRICATED ROTOR

This invention related to gas turbine devices and more particularly concern a gas-driven turbine in which a double rotor has gas-lubricated bearings.

It of been conventional heretofore to provide oil-lubricated bearings for gas-driven motors. The present invention involves a turbine motor having a rotor formed with two symmetrical "image" sections viewed axially of the rotor. The rotor has two sets of helical vanes on each side of a center dividing ring. Gas under pressure enters a stationary casing or stator surrounding the rotor and is circumferentially distributed by a cylindrical manifold around the stator. The gas leaves the manifold through angularly directed passages which impinge on the helical vane of the rotor to rotate it at high speed. The spent gas leaving the rotor passes through and around end bearings. Excess gas is passed out of the stator via radial holes. The end bearings may be ball bearings contained in bearing races or may be disposed in tapered ends of the rotor. End ring bearings may also be employed.

It is therefore a principal object of the invention to provide a gas turbine rotor with gas lubricated bearings.

A further object is to provide a balanced reversely pitched double helical rotor for a gas turbine, the rotor having gas-lubricated bearings.

Another object is to provide a gas turbine motor with a rotor having helical vanes with bearings lubricated by the gas driving the motor.

Another object is to provide a gas turbine motor as described with a cylindrical gas-distributing manifold.

For further comprehension reference may be had to the detailed description taken in connection with the accompanying drawings, in which:

FIG. 1 is a longitudinal axial view of a turbine motor embodying the invention.

FIG. 2 is a cross-sectional view taken on line 2—2 FIG. 1.

FIG. 3 is an exploded perspective view of the motor with rotor shown inside the stator, the stator being shown in longitudinal section.

FIG. 5 is a perspective view of another turbine rotor.

FIG. 6 is a cross-sectional view taken on line 6—6 of FIG. 5.

FIG. 7 is an axial sectional view of a gas turbine employing the rotor of FIGS. 5 and 6.

FIG. 8 is an axial sectional view of another rotor.

FIG. 9 is a side view partially in section of a motor employing the rotor of FIG. 8, shown with an associated transmission including gear train and clutch.

FIG. 10 is an exploded sectional view of the clutch of FIG. 9.

Figure 4:
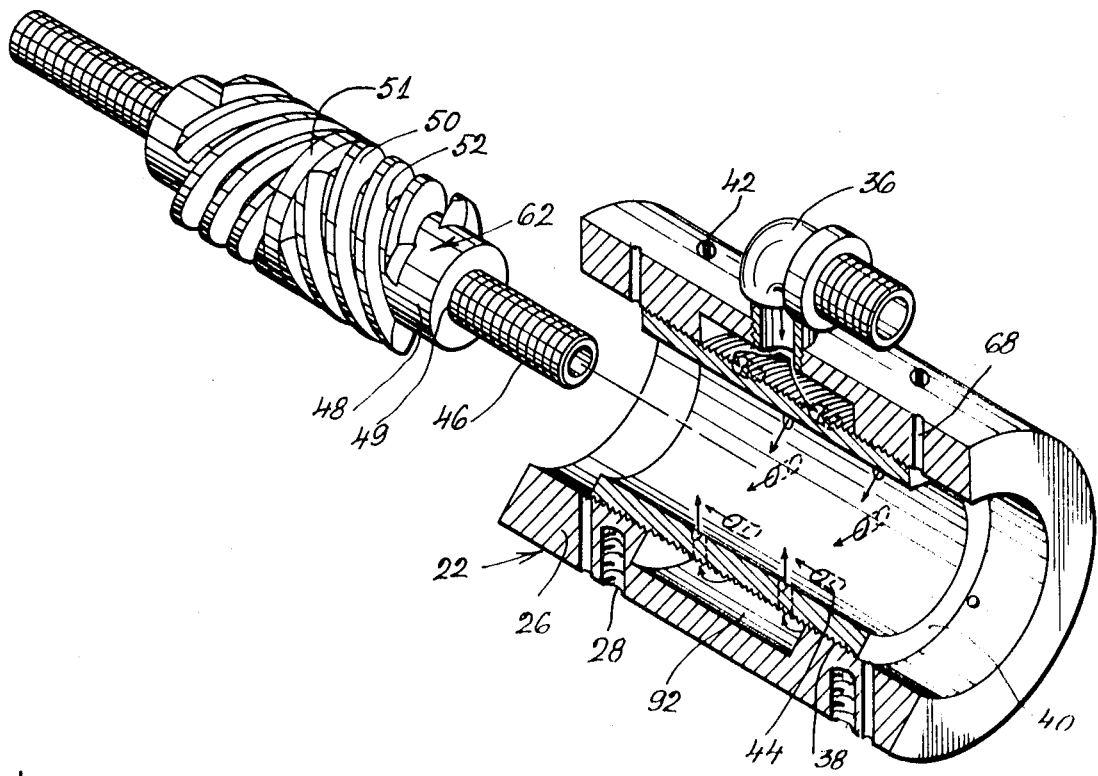
FIG. 4 is an exploded perspective view of the rotor and stator of FIG. 3.

Referring first to FIGS. 1-4, there is shown a gas turbine motor 20 comprising a stator 22 and rotor 25. The stator includes a hollow cylindrical housing 26 having threaded holes 28 receiving bolts 29 to mount the stator on a suitable support 30. The housing is open at both ends. A circumferential recess 32 is formed inside the stator to serve as a gas distributing manifold. Communicating with the recess is a centrally located radial threaded hole 34 in which is engaged a fitting 36. The fitting receives a suitable conduit (not shown) for delivering gas under pressure to the motor. The housing is formed with internal threaded sleeve 38. An externally threaded sleeve 40 is engaged in the housing and may be locked are spaced place by screws 42. Oblique holes 44 are formed in sleeve 40. There are two sets of four holes each. The holes are spaced apart circumferentially of the sleeve and two sets are spaced axially apart on either side of the central transverse plane of the sleeve.

Rotor 25 is an assembly including an externally threaded shaft 46 on which is engaged a generally cylindrical member 48 which has a threaded axial bore 49. Member 48 has two axially spaced sets of helical vanes 50 on opposite sides of annular flange 51. There are four vanes in each set. Each vane is helically curved and extends 360° around the rotor. The vanes in each set all extend in the same direction. The vanes in each set are oppositely pitched from the vanes in the other set. The vanes define helical grooves 52 therebetween. Setscrews 54 at the end of member 48 secure the multiple-vane member to shaft 46. Rings 56 are disposed on shaft 46 at opposite ends of member 48. Bearing races 57,58 are disposed on shanks 59 of two T-nuts 60 engaged on shaft 46 and held in place by setscrews 62. Outer faces of the inner bearing races 57 abut heads 64 of nuts 60. Ball bearings 66 are spaced circumferentially apart between the inner bearing races 57 and outer races 58. Radial holes 68 in housing 26 are located just beyond ends of sleeve 40. Holes 68 are spaced apart circumferentially and pass spent or exhaust gas out of the housing.

Gas enters the housing via fitting 36. The gas is distributed in recess 32 and turns the rotor 25 clockwise as viewed in FIG. 2 as the gas passes through holes 44 to impinge on the helical vanes 50. Flange 51 divides the gas leaving recess 32 through holes 44. The spent gas passes off the rotor at opposite ends thereof and between the bearing races 57, 58 to cool and lubricate bearings 66. Excess gas passes through spaces S and S' and out of holes 68. Space S is defined between the bearing races, ring 56 and sleeve 40 at each end of the rotor. Space S' is defined between outer race 58 and the inside of housing 26 at each end of the rotor. Some gas also passes out of each end of the housing through spaces S'; see FIGS. 1 and 2 in which the arrows indicate the direction of gas flow through the motor. Axial vibration of the rotor is prevented by the balanced axial arrangement of the rotor in which the vanes are oppositely pitched. Gas impinging on these vanes tends to push the rotor in opposite axial directions on opposite sides of flange 51. The spent gas is thus used effectively to lubricate the rapidly turning rotor. Power can be taken off the motor by mounting a suitable tool either end of shaft 46 or by mounting tools on opposite ends of the shaft. FIGS. 5, 6 and 7 show another rotor 25a of a turbine motor 20A. Parts corresponding to motor 20 are identically numbered. In motor 25a cylindrical member 48a has an internally threaded axial bore 49. The cylindrical member 48a has ends 75 which taper radially inward from flanges 73. Ends 75 are concave as clearly shown in FIGS. 5 and 7 and receive ball bearings 66a. The bearings are held on the rotor by threaded rings 76 and the rings are retained by ring nuts 78 held in place by setscrews 80 all on shaft 46a. Axially extending holes 77 are formed in rings 76 through which gas is discharged from opposite ends of the motor. Sleeve 40a is set in place in the center of stator housing 26a. Fitting 36 is engaged in threaded hole 34 and communicates with the rotor via recess 32 and holes 44 in sleeve 40a. The rotor has vanes 50a, on opposite sides of center flange 51a. The flange is formed with a groove 82 in which is set a stabilizing split ring 84. The vanes 50a each extend around the rotor and are pitched in opposite directions.

Motor 20A operates like motor 20 since the rotor is balanced on both sides of a central diametral plane. The vanes cooperate in turning the rotor and inhibit axial vibration since the gas divides at opposite sides of ring 84 and pushes axially in opposite directions while turning the rotor. Gas leaving the opposite ends of the motor passes around the ball bearings to lubricate and cool them. Shaft 46a extends beyond the rotor at opposite sides to receive suitable loads such as grinding or sanding tools or the like.

In FIGS. 8 and 9 is shown another rotor 25b of a turbine motor 20B. This rotor is provided with ring bearings 90 at opposite ends. The bearings are held on threaded shaft 46b by nuts 92 secured by setscrews 93. Vanes 50b are helically curved around cylindrical member 48b and taper radially outward from central annular flange 51b. Threaded shaft 46b extends through threaded bore 49 in member 48b. The left end of the shaft as seen in FIG. 9 terminates in a helical gear 94 formed by grooves machined in the shaft. This gear is engaged by a larger gear 96 carried by a stub shaft 98 journaled in a bearing 99. Shaft 98 carries recessed disk 97 of a clutch 100; see FIG. 10. Clutch plate 102 which engages with disk 97 is slidably mounted on shaft 104 axially alinged with shaft 98. A buffer plate 106 is also slidably mounted on shaft 104. A nut 108 which can be locked in place by a setscrew 110 is adjustably mounted on shaft 104. Coil spring 112 is disposed between nut 108 and plate 106. By this arrangement clutch plate 102 frictionally engages disk 97 under spring bias so that when rotor 15b turns, shaft 104 also turns, but the clutch parts 97, 12 can slip with respect to each other. A suitable driven load (not shown) is mountable on the distal end of shaft 104. Rotor 25b is mounted in cylindrical housing 26b which is constructed like housing 26 of motor 20. Pressurized air or other gas entering recess 32 via pipe fitting 36 passes through holes 44 in sleeve 40 and is discharged on helical vanes 50b to turn the rotor. The spent gas passes out of both ends of the housing through radial holes 68, also around the periphery of rings 90 and through axial holes 90' in the rings to lbricate and cool the bearing rings.

Figures 11, 12:
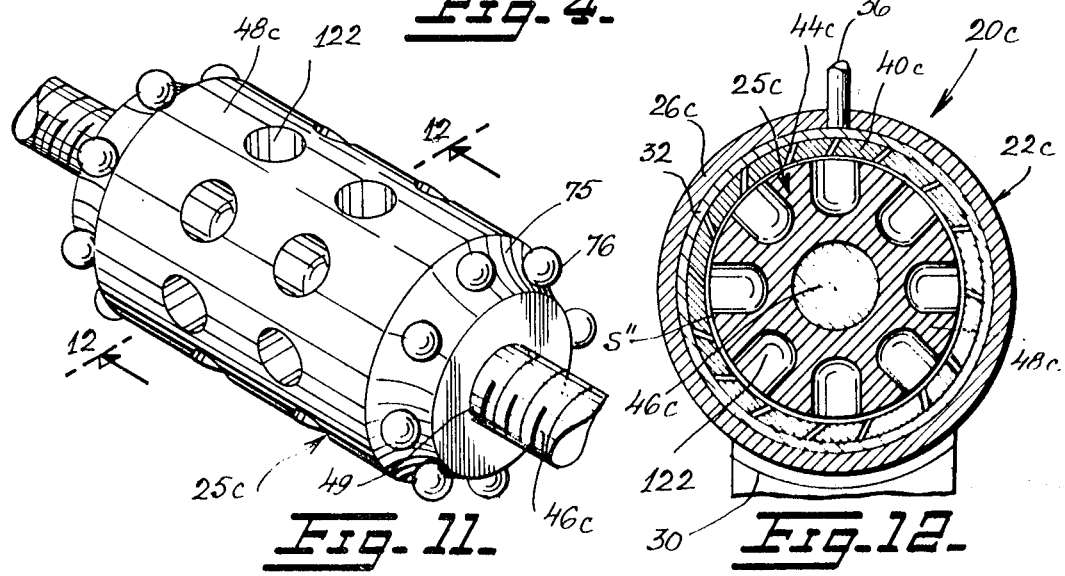
FIG. 11 is a perspective view of a gas lubricated bearing.
FIG. 12 is a cross-sectional view taken on line 12—12 of FIG. 11.

FIGS. 11 and 12 show rotor 25c of a motor 20C. This rotor is similar to rotor 25a of FIG. 5 in that ends 75 are tapered inwardly toward shaft 46c and receive ball bearings 76. Instead of helical vanes, the rotor has sets of holes 122 spaced axially apart. The holes extend radially inward. Oblique holes 44c in sleeve 40c are directed angularly toward rotor. The circumferential spacing of holes 44c is less than the spacing of holes 122 so that the pressurized air fed via fitting 3 into housing 26c of stationary rotor 22c will impinge on the rotor and turn it at high speed. Air passes out of the holes 122 and is distributed around the rotor in space S''. The spent air passes out of opposite ends of the housing to cool and lubricate bearings 76. Other parts of the motor are like motors 20, 20A or 20B and operate in similar fashion.

All the motors described above are gas driven and use the spent gas to cool and lbricate the rotor and rotor bearings. The rotors can operate at very high speeds. It is preferably that the rotory members 48, 48a–48c be made as massive as possible. It is possible to use heavy molecular material such as lead. This will ensure maxiumum stability and uniformity of oeprating speed.

While I have shown and described what I believe to be the best embodiments of my invention, it will be apparent to those skilled in the art that various changes and modifications may be made therein without departing from the spirit and scope of the invention as defined in the appended claims.

What is claimed is:

1. A gas turbine motor comprising a generally cylindrical stator housing open at opposite ends, means for supplying pressurized gas to the housing at a point midway between opposite ends thereof, a cylindrical manifold centered between opposite ends of the housing to receive gas supplied thereto and to distribute the gas circumferentially around inside the housing, a rotor comprising a generally cylindrical member rotatably disposed inside the housing and arranged to receive gas leaving the manifold and impinging on the rotor to turn the same, a shaft extending axially of the rotor for engagement by a driven load and bearing means at opposite ends of said cylindrical member arranged to be cooled and lubricated by spent gas passing out of opposite ends of the housing, said cylindrical member has a central annular, circumferential flange, and sets of helical vanes on opposite sides of said flange, said vanes being oppositely pitched to cooperate in turning the rotor when said gas impinges thereon while inhibiting axial vibration of the rotor.

2. A gas turbine motor as defined in claim 1, wherein said bearing means are ball bearings contained in bearing races engaged on said shaft.

3. A gas turbine motor as defined in claim 1, wherein said bearing means comprise floating members on ends of the rotor which is rotatively supported by said gas, said floating members cooperatively serving as valves for the supportive gas, said floating members being displaced oppositely by the gas flow as the rotor rotates to stabilize the rotor and minimize axial vibration.

4. A gas turbine motor as defined in claim 1, wherein the clindrical manifold has a cylindrical recess formed in said housing and oblique holes communicating between said recess and the interior of the housing to direct gas at oblique angles against said vanes.

5. A gas turbine motor as defined in claim 4, wherein said bearing means are ball bearings at opposite ends of the cylindrical member.

6. A gas turbine motor as defined in claim 5, wherein said housing has radial holes near opposite ends to pass excess gas out of the housing after the same has cooled and lubricated said bearings.